United States Patent Office 3,524,865
Patented Aug. 18, 1970

3,524,865
KALAMYCIN ALKYLATES AND ACYLATES
Herman Hoeksema, Cooper Township, Kalamazoo County, Mich., assignor to The Upjohn Company, Kalamazoo, Mich, a corporation of Delaware
No Drawing. Filed Oct. 23, 1967, Ser. No. 677,060
Int. Cl. C07d 5/06
U.S. Cl. 260—343.6      4 Claims

ABSTRACT OF THE DISCLOSURE

Kalamycin alkylates and acylates having the following formula:

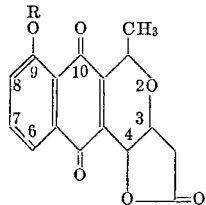

wherein R is alkyl of from 1 to 16 carbon atoms, inclusive, and isomeric forms thereof, or wherein R is hydrocarbon carboxylic acid acyl of from two to eighteen carbon atoms, inclusive; halo-, nitro-, hydroxy-, amino-, cyano-, thiocyano-, and loweralkoxy-substituted hydrocarbon carboxylic acid acyl of from two to eighteen carbon atoms, inclusive; and loweralkoxycarbonyl. These kalamycin derivatives can be used as antifungal agents, for example, to inhibit the growth of *Cryptococcus neoformans* in pigeon roosts.

BRIEF SUMMARY OF THE INVENTION

This invention relates to novel derivatives of the antibiotic kalamycin and to processes for the preparation thereof, and is particularly directed to 9-0-alkylated kalamycins and 9-0-acylated kalamycins, and to processes for producing them.

Kalamycin is an antibiotic obtainable as an elaboration product of a kalamycin-producing actinomycete. Methods for the production, recovery and purification of kalamycin are described in U.S. Pat. 3,300,382. Kalamycin is particularly suitable an an antifungal agent, though it is also active against various Gram-positive and Gram-negative bacteria.

It has now been found, according to this invention, that novel 9-0-derivatives of kalamycin can be formed which possess antifungal activity against the same fungi as kalamycin but, unexpectedly, demonstrate a lower degree of toxicity than kalamycin. For example, 9-0-methyl kalamycin, which is formed by reacting kalamycin with methyl iodide, has a maximum tolerated dose (MTD) of about 40 mg./kg. as compared to the MTD of kalamycin which is about 10 mg./kg. These MTD values were determined in tests using groups of five CF-1 mice weighing 18–20 grams each. The test compounds were administered subcutaneously at a rate of one dose daily for four days.

The novel 9-0-alkylated kalamycins of the invention can be prepared by reacting kalamycin with an alkyl halide, preferably an alkyl iodide, in the presence of an iodide or halide precipitating agent, for example, silver oxide. 9-0-acylated kalamycins of the invention can be prepared by acylating kalamycin directly with an acid halide or anhydride of a selected hydrocarbon carboxylic acid, in the presence of an acid-binding agent.

DETAILED DESCRIPTION 9-0-alkylated kalamycins are prepared by reacting kalamycin with an alkyl halide, preferably an alkyl iodide, in the presence of a halide precipitating agent, for example, silver oxide, silver carbonate, and the like. The reaction, advantageously, can be conducted at reflux for a period of from 4–10 hours. Lower reaction temperatures, i.e., less than reflux, also can be used but these tend to prolong the reaction time unnecessarily. The course of the reaction can be followed by thin-layer chromatography (TLC) using silica gel which can be developed by a solvent system consisting of ethyl acetate-cyclohexane (3:5, v.:v.). When TLC shows the starting material kalamycin to be depleted, the reaction mixture can be filtered and the filtrate acidified with a mineral acid, for example, hydrochloric acid. The acidified filtrate then can be evaporated to dryness and dried in a desiccator. Crystalline 9-0-alkylated kalamycin can be recovered from this dried residue by dissolving the same in boiling acetone. Crystallization of the desired product occurs spontaneously thereafter.

Examples of alkyl halides which can be used in the process of this invention are methyl iodide, ethyl iodide, ethyl bromide, ethyl chloride, propyl iodide, butyl iodide, pentyl iodide, hexyl iodide, heptyl iodide, octyl iodide, nonyl iodide, decyl iodide, undecyl iodide, dodecyl iodide, tridecyl iodide, tetradecyl iodide, pentadecyl iodide, hexadecyl iodide, and the like.

9-0-acylated kalamycins, according to this invention, are obtained by direct acylation of kalamycin with an acid halide or anhydride of a selected hydrocarbon carboxylic acid in the presence of a weak acid-binding agent. Suitable acid-binding agents include amines such as pyridine, quinoline, and isoquinoline, and buffer salts such as sodium acetate. The preferred base is pyridine. Carboxylic acids suitable for esterification include (a) saturated or unsaturated, straight or branched chain aliphatic carboxylic acids, for example, acetic, propionic, butyric isobutyric, tert-butylacetic, valeric, isovaleric, caproic, caprylic, decanoic, dodecanoic, lauric, tridecanoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexanecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclohexaneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon-carboxylic acids as given above which are substituted by one or more of halogen, nitro, hydroxy, amino, cyano, or thiocyano, or loweralkoxy, advantageously loweralkoxy of not more than six carbon atoms, for example, methoxy, ethoxy, propoxy, butoxy, amyloxy, hexyloxy, and isomeric forms thereof. Examples of such substituted hydrocarbon carboxylic acids are:

mono-, di-, and trichloroacetic acid;
α- and β-chloropropionic acid;
α- and γ-bromobutyric acid;
α- and δ-iodovaleric acid;
mevalonic acid;
2- and 4-chlorocyclohexanecarboxylic acid;
shikimic acid;
2-nitro-1-methyl-cyclobutanecarboxylic acid;
1,2,3,4,5,6-hexachlorocyclohexanecarboxylic acid;
3-bromo-2-methylcylohexanecarboxylic acid;
4- and 5-bromo-2-methylcyclohexanecarboxylic acid;
5- and 6-bromo-2-methylcyclohexanecarboxylic acid;
2,3-dibromo-2-methylcyclohexanecarboxylic acid;
2,5-dibromo-2-methylcyclohexanecarboxylic acid;
4,5-dibromo-2-methylcyclohexanecarboxylic acid;
5,6-dibromo-2-methylcyclohexanecarboxylic acid;
3-bromo-3-methylcyclohexanecarboxylic acid;
6-bromo-3-methylcyclohexanecarboxylic acid;
1,6-dibromo-3-methylcyclohexanecarboxylic acid;
2-bromo-4-methylcyclohexanecarboxylic acid;
1,2-dibormo-4-methylcyclohexanecarboxylic acid;
3-bromo-2,2,3-trimethylcyclopentanecarboxylic acid;
1-bromo-3,5-dimethylcyclohexanecarboxylic acid;
homogentisic acid, o-, m-, and p-chlorobenzoic acid;
anisic acid;
salicyclic acid;
p-hydroxybenzoic acid;
β-resorcylic acid;
gallic acid;
veratric acid;
trimethoxybenzoic acid;
trimethoxycinnamic acid;
4,4'-dichlorobenzilic acid;
o-, m-, and p-nitrobenzoic acid;
cyanoacetic acid;
3,4- and 3,5-dinitrobenzoic acid;
2,4,6-trinitrobenzoic acid;
thiocyanoacetic acid;
cyanopropionic acid;
lactic acid;
ethoxyformic acid (ethyl hydrogen carbonate);
and the like.

The acylation, advantageously, is conducted by treating a solution of kalamycin in an acid anhydride with a small amount of base and heating the resulting mixture, if desired, for a short period at about 100° C. to complete the reaction. Water can be added to the reaction mixture to hydrolyze the acylating agent and the desired product can be isolated by conventional procedures.

The novel compounds of this invention are active against various fungi. For example, 9-0-methyl kalamycin is active against the following fungi: *Nocardia asteroides, Blastomyces dermatitidis, Coccidioides immitis, Geotrichum sp., Hormodendrum compactum, Phialophora verrucosa, Cryptococcus neoformans, Histoplasma capsulatum, Sporotrichum schenckii, Monosporium apiospermum, Trichophyton rubrum, Microsporum canis, Trichophyton interdigitale, Candida albicans, Trichophyton violaceum, Trichophyton asteroides,* and *Trichophyton mentagrophytes.* Thus, the compounds of this invention can be used to treat pigeon roosts to inhibit this fungus which has been found in pigeon droppings. Also, these compounds can be used as the antifungal agent in the shoe uppers disclosed in U.S. Pat. 3,130,505. Furthermore, the novel compounds of this invention can be used to swab laboratory benches and equipment in a mycological laboratory; they also can be used to stimulate the growth of actinomycetes in soil dilution plates of agar media. (Canadian Journal of Microbiology, vol. 12, p. 1091, 1966).

All percentages in the following examples are by weight and all solvent mixture proportions are by volume unless otherwise noted.

EXAMPLE 1

9-0-methyl kalamycin 3,4,5,10 - tetrahydro - 4 - hydroxy-9-methoxy-1-methyl-5,10 - dioxo - 1H - naphtho[2,3 - c]pyran - 3 - acetic acid γ-lactone.

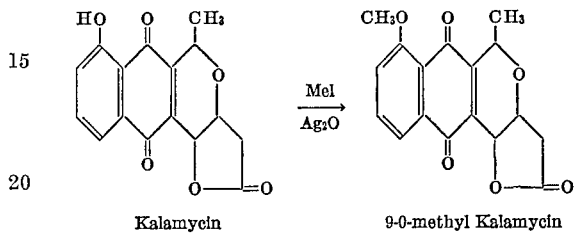

To 3 gm. (0.01 mole) of kalamycin in 150 ml. of dry acetone was added 150 ml. of methyl iodide. This solution was brought to reflux and 1.5 gm. of silver oxide was added. A second 1.5 gm. portion of silver oxide was added one hour later and a third two hours after the initial addition. Reflux was continued with stirring and the course of reaction was followed on thin layer chromatography using silica gel developed by ethyl acetatecyclohexane (3:5). Upon disappearance of the starting material, the mixture was filtered and the mixture was acidified with 0.1 N HCl. The filtrate was then evaporated to dryness and dried in a desiccator. The residue was dissolved in boiling acetone and crystallized in the refrigerator; yield, 1.38 gm. of 9-0-methyl kalamycin. Recrystallization produced 950 mg. of 9-0-methyl kalamycin crystals having a melting point of 205–215° C.

*Analysis.*—Calc'd for $C_{17}H_{14}O_6$ (mol. wt., 314.28) (percent): C, 64.97; H, 4.49; O, 30.55. Found (percent): C, 65.05; H, 4.84. Molecular weight by mass spectrometry—314.

EXAMPLE 2

By substituting the methyl iodide in Example 1 by ethyl iodide, ethyl bromide, propyl iodide, butyl iodide, pentyl iodide, hexyl iodide, heptyl iodide, octyl iodide, nonyl iodide, decyl iodide, undecyl iodide, dodecyl iodide, tridecyl iodide, tetradecyl iodide, pentadecyl iodide, and hexadecyl iodide, there is obtained a corresponding 9-0 alkyl kalamycin.

EXAMPLE 3

A sample of kalamycin (approximately 40 mg.) is mixed with acetic anhydride (2 ml.) and 1 drop of pyridine is added. The mixture is heated on the steam bath for ½ hr., then stored at room temperature 1 day. Thereupon it is added to ice-water and an orange solid recovered. This solid is purified by chromatography on silica gel to yield 9–0 acetyl kalamycin.

*Analysis.*—Calc'd for $C_{18}H_{14}O_7$ (mol. wt., 342.29) (percent): C, 63.16; H, 4.12; O, 32.72.

EXAMPLE 4

By substituting the acetic anhydride in Example 3 by anhydrides of hydrocarbon carboxylic acids of from 3 to 12 carbon atoms, inclusive, there is obtained the corresponding 9-0-acyl kalamycin.

EXAMPLE 5

By substituting the acetic anhydride in Example 3 by anhydrides of hydrocarbon carboxylic acids of from 10 to 18 carbon atoms, inclusive, in the presence of a solvent, for example, diethyl ether, methylene chloride, carbon tetrachloride, and the like, there is obtained the corresponding 9-0-acyl kalamycin.

I claim:
1. A compound of the formula:

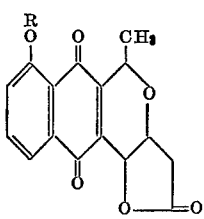

wherein R is alkyl of from 1 to 16 carbon atoms, inclusive, or wherein R is hydrocarbon carboxylic acid acyl of from 2 to 18 carbon atoms, inclusive; halo-, nitro-, hydroxy-, amino-, cyano-, thiocyano-, and loweralkoxy-substituted hydrocarbon carboxylic acid acyl of from 2 to 18 carbon atoms, inclusive; and loweralkoxycarbonyl.

2. A compound, according to claim 1, of the formula:

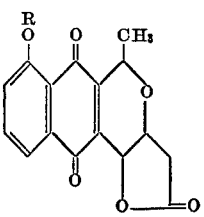

wherein R is alkyl of from 1 to 16 carbon atoms, inclusive.

3. A compound, according to claim 1, of the formula:

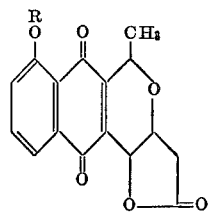

wherein R is hydrocarbon carboxylic acid acyl of from 2 to 18 carbon atoms, inclusive; halo-, nitro-, hydroxy-, amino-, cyano-, thiocyano-, and loweralkoxy-substituted hydrocarbon carboxylic acid acyl of from 2 to 18 carbon atoms, inclusive.

4. 3,4,5,10-tetrahydro-4-hydroxy-9-methoxy-1 - methyl-5,10-dioxo-1H-naphtho[2,3-c]pyran - 3 - acetic acid γ-lactone.

References Cited

Wagner & Zook: Synthetic Organic Chemistry, 1953, pp. 226–228.

Morrison & Boyd: Organic Chemistry, 1961, pp. 412–414.

ALEX MAZEL, Primary Examiner

J. A. NARCAVAGE, Assistant Examiner

U.S. Cl. X.R.
424—279